United States Patent
Hadley (10) Patent No.: US 9,483,422 B2
(45) Date of Patent: Nov. 1, 2016

(54) ACCESS TO MEMORY REGION INCLUDING CONFIDENTIAL INFORMATION

(75) Inventor: Ted A. Hadley, Sunnyvale, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/232,224

(22) PCT Filed: Jan. 31, 2012

(86) PCT No.: PCT/US2012/023385
§ 371 (c)(1),
(2), (4) Date: Jan. 10, 2014

(87) PCT Pub. No.: WO2013/012444
PCT Pub. Date: Jan. 24, 2013

(65) Prior Publication Data
US 2014/0156961 A1    Jun. 5, 2014

Related U.S. Application Data

(60) Provisional application No. 61/509,078, filed on Jul. 18, 2011.

(51) Int. Cl.
*G06F 12/00* (2006.01)
*G06F 3/00* (2006.01)
(Continued)

(52) U.S. Cl.
CPC .............. *G06F 13/1642* (2013.01); *G06F 1/24* (2013.01); *G06F 11/2284* (2013.01); *G06F 12/1433* (2013.01); *G06F 12/1483* (2013.01); *G06F 13/1663* (2013.01); *G06F 21/54* (2013.01); *G06F 21/55* (2013.01); *G06F 21/57* (2013.01); *G06F 21/575* (2013.01);
(Continued)

(58) Field of Classification Search
None
See application file for complete search history.

(56) References Cited

U.S. PATENT DOCUMENTS 5,131,040 A  7/1992  Knapczyk
5,249,286 A  9/1993  Alpert et al.
(Continued)

FOREIGN PATENT DOCUMENTS

CN    1650183 A    8/2005
CN    101120353 A    2/2008
(Continued)

OTHER PUBLICATIONS

"ARM Security Technology Building a Secure System Using TrustZone® Technology", < http://infocenter.arm.com/help/topic/com.arm.doc.prd29-genc-009492c/PRD29-GENC-009492C_trustzone_security_whitepaper.pdf > Issue: C, 2009.
(Continued)

*Primary Examiner* — Idriss N Alrobaye
*Assistant Examiner* — Richard B Franklin
(74) *Attorney, Agent, or Firm* — Hewlett Packard Enterprise Patent Department (57) ABSTRACT

Embodiments herein relate to accessing a memory region including confidential information. A memory request from a process may be received. The memory request may include a process ID (PID) of the process, a requested memory address, and a requested access type. The memory request may be compared to a permission set associated with a memory region including the confidential information. Access to the memory region by the process may be controlled based on the comparison.

15 Claims, 9 Drawing Sheets

(51) Int. Cl.
| | | |
|---|---|---|
| *G06F 13/16* | (2006.01) | |
| *H04L 9/32* | (2006.01) | |
| *G06F 21/54* | (2013.01) | |
| *G06F 21/75* | (2013.01) | |
| *H04L 9/08* | (2006.01) | |
| *G06F 1/24* | (2006.01) | |
| *G06F 21/57* | (2013.01) | |
| *G06F 12/14* | (2006.01) | |
| *G06F 21/60* | (2013.01) | |
| *G06F 21/55* | (2013.01) | |
| *G06F 21/72* | (2013.01) | |
| *G06F 21/79* | (2013.01) | |
| *G06F 21/78* | (2013.01) | |
| *G09C 1/00* | (2006.01) | |
| *G06F 11/22* | (2006.01) | |
| *G06F 21/74* | (2013.01) | |
| *G01R 31/317* | (2006.01) | |

(52) U.S. Cl.
CPC ............ *G06F 21/602* (2013.01); *G06F 21/72* (2013.01); *G06F 21/74* (2013.01); *G06F 21/75* (2013.01); *G06F 21/78* (2013.01); *G06F 21/79* (2013.01); *G09C 1/00* (2013.01); *H04L 9/088* (2013.01); *H04L 9/0816* (2013.01); *H04L 9/32* (2013.01); *G01R 31/31719* (2013.01); *G06F 2221/2143* (2013.01); *H04L 2209/12* (2013.01)

(56) References Cited

U.S. PATENT DOCUMENTS

| | | | |
|---|---|---|---|
| 5,469,564 | A | 11/1995 | Junya |
| 5,600,576 | A | 2/1997 | Broadwater et al. |
| 5,825,878 | A | 10/1998 | Takahashi et al. |
| 5,937,063 | A | 8/1999 | Davis |
| 5,987,557 | A | 11/1999 | Ebrahim |
| 6,078,873 | A | 6/2000 | Shutty et al. |
| 6,188,603 | B1 | 2/2001 | Takeda |
| 6,424,143 | B1 | 7/2002 | Blossfeld et al. |
| 6,466,048 | B1 | 10/2002 | Goodman |
| 6,553,492 | B1 | 4/2003 | Hosoe |
| 6,553,496 | B1 | 4/2003 | Buer |
| 6,745,306 | B1* | 6/2004 | Willman et al. .............. 711/163 |
| 6,835,579 | B2 | 12/2004 | Elward |
| 6,836,548 | B1 | 12/2004 | Anderson et al. |
| 6,910,094 | B1 | 6/2005 | Eslinger et al. |
| 6,928,551 | B1 | 8/2005 | Lee et al. |
| 7,039,816 | B2 | 5/2006 | Kocher et al. |
| 7,062,615 | B2 | 6/2006 | Miller et al. |
| 7,107,459 | B2 | 9/2006 | Caronni et al. |
| 7,218,567 | B1 | 5/2007 | Trimberger et al. |
| 7,237,121 | B2 | 6/2007 | Cammack et al. |
| 7,299,365 | B2 | 11/2007 | Evans |
| 7,360,073 | B1 | 4/2008 | Billstrom et al. |
| 7,398,441 | B1 | 7/2008 | Gee |
| 7,423,529 | B2 | 9/2008 | Singer et al. |
| 7,424,398 | B2 | 9/2008 | Booth et al. |
| 7,457,960 | B2 | 11/2008 | Kablotsky |
| 7,525,836 | B2 | 4/2009 | Backus et al. |
| 7,568,112 | B2 | 7/2009 | Yamaguchi |
| 7,657,760 | B2 | 2/2010 | Teramoto et al. |
| 7,667,997 | B2 | 2/2010 | Rodriguez |
| 7,681,024 | B2 | 3/2010 | Kwon |
| 7,729,156 | B2 | 6/2010 | Rodriguez et al. |
| 7,733,250 | B1 | 6/2010 | Tsyrganovich |
| 7,757,098 | B2 | 7/2010 | Brannock et al. |
| 7,761,904 | B2 | 7/2010 | Hessel et al. |
| 7,774,619 | B2 | 8/2010 | Paaske et al. |
| 7,793,067 | B2* | 9/2010 | Kegel et al. .................. 711/202 |
| 7,831,839 | B2 | 11/2010 | Hatakeyama |
| 7,844,835 | B2 | 11/2010 | Ginter et al. |
| 7,949,912 | B1 | 5/2011 | Trimberger |
| 7,954,153 | B2 | 5/2011 | Bancel et al. |
| 8,027,927 | B2 | 9/2011 | Ogg et al. |
| 2001/0010086 | A1 | 7/2001 | Katayama et al. |
| 2003/0133574 | A1 | 7/2003 | Caronni |
| 2003/0140228 | A1 | 7/2003 | Binder |
| 2003/0200453 | A1 | 10/2003 | Foster et al. |
| 2003/0200454 | A1 | 10/2003 | Foster et al. |
| 2004/0088333 | A1 | 5/2004 | Sidman |
| 2004/0148480 | A1 | 7/2004 | Watt et al. |
| 2004/0210764 | A1 | 10/2004 | McGrath et al. |
| 2005/0144358 | A1 | 6/2005 | Conley et al. |
| 2006/0031685 | A1 | 2/2006 | Chen et al. |
| 2006/0059373 | A1 | 3/2006 | Fayad et al. |
| 2006/0090084 | A1 | 4/2006 | Buer |
| 2006/0101241 | A1 | 5/2006 | Curran et al. |
| 2006/0168212 | A1 | 7/2006 | Parsons et al. |
| 2006/0179302 | A1 | 8/2006 | Hatakeyama |
| 2006/0179324 | A1 | 8/2006 | Hatakeyama |
| 2006/0184791 | A1 | 8/2006 | Schain et al. |
| 2006/0215437 | A1 | 9/2006 | Trika et al. |
| 2007/0067644 | A1 | 3/2007 | Flynn et al. |
| 2007/0136606 | A1 | 6/2007 | Mizuno |
| 2007/0140477 | A1 | 6/2007 | Wise |
| 2007/0174909 | A1 | 7/2007 | Curchett et al. |
| 2007/0192610 | A1 | 8/2007 | Chun et al. |
| 2007/0237325 | A1 | 10/2007 | Gershowitz et al. |
| 2007/0283140 | A1 | 12/2007 | Jones et al. |
| 2008/0005586 | A1 | 1/2008 | Munguia |
| 2008/0010567 | A1 | 1/2008 | Hughes |
| 2008/0072018 | A1 | 3/2008 | Le et al. |
| 2008/0112405 | A1 | 5/2008 | Cholas et al. |
| 2008/0162848 | A1 | 7/2008 | Broyles et al. |
| 2008/0165952 | A1 | 7/2008 | Smith et al. |
| 2009/0055637 | A1 | 2/2009 | Holm et al. |
| 2009/0138699 | A1 | 5/2009 | Miyazaki et al. |
| 2009/0150546 | A1 | 6/2009 | Ryan |
| 2009/0154705 | A1 | 6/2009 | Price et al. |
| 2009/0172496 | A1 | 7/2009 | Roine |
| 2009/0196418 | A1 | 8/2009 | Tkacik et al. |
| 2009/0259854 | A1 | 10/2009 | Cox et al. |
| 2009/0262940 | A1 | 10/2009 | Lim |
| 2009/0290712 | A1 | 11/2009 | Henry et al. |
| 2009/0292732 | A1 | 11/2009 | Manolescu et al. |
| 2009/0293130 | A1 | 11/2009 | Henry et al. |
| 2009/0328201 | A1 | 12/2009 | Jin et al. |
| 2010/0057960 | A1 | 3/2010 | Renno |
| 2010/0064125 | A1 | 3/2010 | Liu et al. |
| 2010/0088739 | A1 | 4/2010 | Hall et al. |
| 2010/0268942 | A1 | 10/2010 | Hernandez-Ardieta et al. |
| 2010/0312940 | A1 | 12/2010 | Shinohara |
| 2011/0012709 | A1 | 1/2011 | Payson et al. |
| 2011/0026831 | A1 | 2/2011 | Perronnin et al. |
| 2011/0095776 | A1 | 4/2011 | Yunoki |
| 2011/0116635 | A1 | 5/2011 | Bar-el |
| 2011/0154501 | A1 | 6/2011 | Banginwar |
| 2012/0224691 | A1 | 9/2012 | Purohit |
| 2013/0305380 | A1 | 11/2013 | Diehl |
| 2014/0115698 | A1* | 4/2014 | Jogand-Coulomb et al. .. 726/21 |
| 2014/0358949 | A1 | 12/2014 | Hu |

FOREIGN PATENT DOCUMENTS

| | | |
|---|---|---|
| CN | 101995301 | 3/2011 |
| EP | 0987625 | 3/2000 |
| JP | 06-028885 | 2/1994 |
| JP | 08-069697 | 3/1996 |
| JP | 2008192036 | 8/2008 |
| WO | WO-9745960 A1 | 12/1997 |
| WO | WO-9931665 | 6/1999 |

OTHER PUBLICATIONS

Anderson, R. et al., "Cryptographic Processors—A Survey," Proceedings of the IEEE, vol. 94, No. 2, Feb. 2006, pp. 357-369.

Bialas; "Intelligent Sensors Security", Sensors, Institute of Innovative Technologies EMAG, 40-189 Katowice, ul. Leopolda 31, Poland, ISSN 1424-8220, Jan. 22, 2010. <www.mdpi.com/journal/sensors>.

(56) References Cited

OTHER PUBLICATIONS

Datta et al.; "Calibration of On-Chip Thermal Sensors using Process Monitoring Circuits", University of Massachusetts, Amherst, MA USA, IEEE 978-1-4244-6455-5/10, 2010.
Fields, et al; "Cryptographic Key Protection Module in Hardware for the Need2know System", < http://ieeexplore.ieee.org/stamp/stamp.jsp?arnumber=1594225 > On pp. 814-817; vol. 1, Aug. 7-10, 2005.
Gilmont, et al; "An Architecture of Security Management Unit for Safe Hosting of Multiple Agents", < http://citeseerx.ist.psu.edu/viewdoc/summary?doi=10.1.1.21.3663 > On pp. 79-82, 1998.
International Search Report and Written Opinion received in PCT Application No. PCT/US2011/065081, mailed Jul. 25, 2012, 9 pgs.
International Search Report and Written Opinion received in PCT Application No. PCT/US2011/066750, mailed on Sep. 20, 2012. 10 pgs.
International Search Report and Written Opinion received in PCT Application No. PCT/US2012/020528, mailed Aug. 22, 2012, 9 pgs.
International Search Report and Written Opinion received in PCT Application No. PCT/US2012/023385, mailed May 22, 2012, 10 pgs.
International Search Report and Written Opinion received in PCT Application No. PCT/US2012/023794, mailed Sep. 24, 2012, 9 pgs.
International Search Report and Written Opinion received in PCT Application No. PCT/US2012/024367, mailed Jul. 16, 2012, 10 pgs.
International Search Report and Written Opinion received in PCT Application No. PCT/US2012/031542, mailed Sep. 27, 2012, 9 pgs.
International Search Report and Written Opinion received in PCT Application No. PCT/US2012/065066, mailed Jul. 16, 2012, 9 pgs.
Sun Microsystems, "Sun Cryptographic Accelerator 4000", Firmware Version 1.1, FIPS 140-2 Non-Proprietary, Security Policy, Level 3 Validation, Aug. 6, 2004, pp. 1-20, <oracle.com/technetwork/topics/security/140sp457-160924.pdf>.
Yang, et al; "Improving Memory Encryption Performance in Secure Processors", <http://ieeexplore.ieee.org/stamp/stamp.jsp?arnumber=1407851 > On pp. 630-640; vol. 54; Issue: 5, May 2005.
Yao, et al.; "Calibrating On-chip Thermal Sensors in Integrated Circuits; A Design-for-Calibration Approach", Springer Science+Business Media, LLC 2011, Sep. 21, 2011.
Extended European Search Report, Feb. 5, 2015, European Patent Application No. 12814537.2, 6 pages.
Supplementary Partial European Search Report, European Patent Application No. 12814434.2, Jan. 28, 2016, 10 pages.

\* cited by examiner

ACCESS TO MEMORY REGION INCLUDING CONFIDENTIAL INFORMATION

PRIORITY INFORMATION

This application claims the benefit of priority on U.S. Provisional Application No. 61/509,078, filed Jul. 18, 2011, the entire contents of which are incorporated herein in their entirety by reference.

BACKGROUND

A device may store confidential information, such as a cryptographic security parameter (CSP). However, an integrity or security of the confidential information may be compromised if accessed by an unauthorized party. Programming a process of the device to only access confidential information for which the process has authority to access, may be unreliable.

For example, the process may malfunction and/or be manipulated by an unauthorized party, such as a hacker, and access confidential information for which the process does not have authorization. Manufacturers, vendors, and/or users are challenged to provide more secure methods for protecting confidential information.

BRIEF DESCRIPTION OF THE DRAWINGS

The following detailed description references the drawings, wherein.

DETAILED DESCRIPTION

Specific details are given in the following description to provide a thorough understanding of embodiments. However, it will be understood by one of ordinary skill in the art that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

A device may store confidential information, such as a cryptographic security parameter (CSP). In order to maintain an integrity or security of this confidential information, the device may use a secondary processor to control access to the confidential information. However, this may increase a cost and complexity of the device and decrease performance. For example, a main processor of the device may have to communicate with the secondary processor before receiving access to the confidential information.

Alternatively, the confidential information may be separated and stored with the processes that may use the confidential information. However, in this case, the confidential information may not be accessible unless the corresponding process is loaded and running. Further, if the process is running, a memory management unit (MMU) may limit access to the process's memory. In addition, separating the confidential information among multiples locations may compromise the integrity and/or security of the confidential information. Moreover, the process may malfunction and/or be manipulated by an unauthorized party, such as a hacker, thus reducing an integrity or security of the confidential information.

Embodiments may increase a security and/or integrity of the confidential information without greatly increasing a complexity of the device. For example, in embodiments, a memory request from a process may be received. The memory request may include a process ID (PID) of the process, a requested memory address, and a requested access type. The memory request may be compared to a permission set associated with a memory region including the confidential information. Access to the memory region by the process may be controlled based on the comparison. Thus, access permissions to each part of the confidential information may be separately and selectively based on a variety of factors, such as the PID, requested address, the requested access type, a purpose and a user ID (UID).

Further, embodiments may also carry out additional operations if access to the confidential information by the process is denied. For example, an audit log may be generated when the process requests an improper type of access, in order to maintain a record of faded attempts to access the confidential information. Further, embodiments may carry out an action, such as clearing the confidential information or generating an interrupt, if the PID of the process or the requested address is incompatible.

Figure 1:
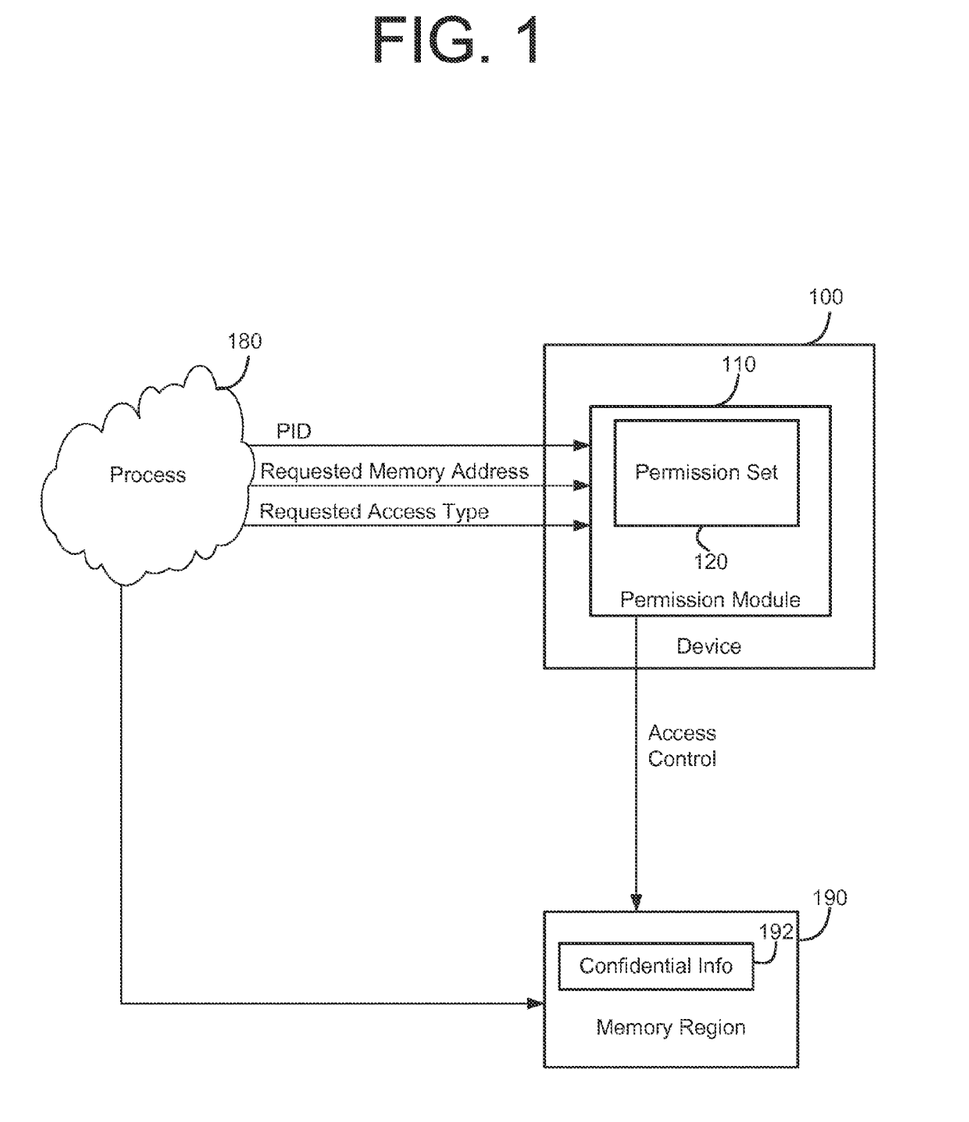
FIG. 1 is an example block diagram of a device for controlling access to a memory region.

Referring now to the drawings, FIG. 1 is an example block diagram of a device 100 for controlling access to a memory region 190. The device 100 may be included in any type of device that accesses a memory, such as a secure microprocessor, a notebook computer, a desktop computer, an all-in-one system, a slate computing device, a portable reading device, a wireless email device, a mobile phone, and the like. In the embodiment of FIG. 1, the device 100 includes a permission module 110. The permission module 110 further includes a permission set 120.

The permission module 110 may include, for example, a hardware device including electronic circuitry for implementing the functionality described below, such as a register or Boolean logic. In addition or as an alternative, the permission module 110 may be implemented as a series of instructions encoded on a machine-readable storage medium and executable by a processor.

The memory region 190 may be part of a machine-readable storage medium, such as any type of electronic, magnetic, optical, or other physical storage device capable of storing information, like data or instructions. Example of the machine-readable storage medium include Random Access Memory (RAM), an Electrically Erasable Programmable Read-Only Memory (EEPROM), a storage drive, a Compact Disc Read Only Memory (CD-ROM), and the like.

The permission module 110 is to receive a memory request from a process 180. The term process may refer to any part of a computer program or instance thereof. The memory request may include a process ID (PD) of the process 180, a requested memory address, and a requested access type. The permission module 110 may compare the memory request to the permission set 120, which is associated with the memory region 190 storing confidential information 192. The permission module 110 may then control access to the memory region 190 by the process 180 based on the comparison. For example, the permission module 110 may output an access control signal to the memory region 190 that enables and/or disables an ability of the process 180 to access the memory region 190.

The confidential information 192 may any type of information to which access is restricted to authorized parties. Examples of the confidential information 192 may include a key, a certificate, information associated with platform security of the device 100, cryptographic information, private user data, and the like. Example operations of the permission module 110 will be explained in greater detail below with respect to FIGS. 2 to 4.

Figure 2:
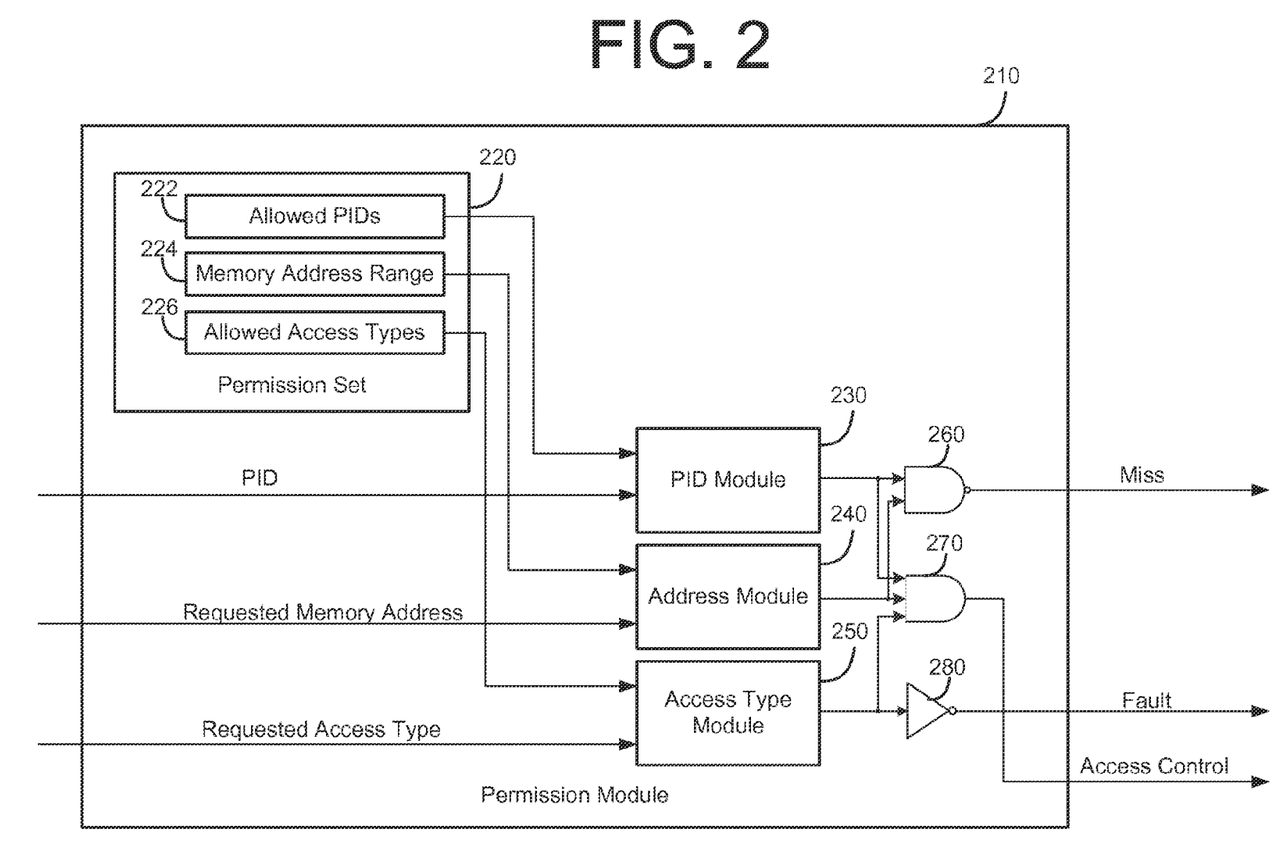
FIG. 2 is an example block diagram of a permission module of the device of FIG. 1.

FIG. 2 is an example block diagram of a permission module 210 of the device 100 of FIG. 1. In the embodiment of FIG. 2, the permission module 210 includes a permission set 220, a PID module 230, an address module 240, an access type module 250, a first NAND gate 260, a first AND gate 270 and a NOT gate 280.

The permission set 220 includes one more allowed PIDs 222, a memory address range 224, and one or more allowed access types 226 associated with the memory region 190. The one or more allowed PIDs 222 may indicate one or more processes that are allowed to access the memory region 190. The memory address range 224 may indicate the addresses that may be accessed when requesting access to memory region 190. The access types 226 include at least one of read, write and reference types. The read type indicates whether the process 180 has permission to read a value at the requested memory address. The write type indicates whether the process 180 has permission to modify, clear, write, and/or overwrite a value at the requested memory address. The reference type indicates whether the process 180 has permission to provide a pointer to the requested memory address, instead of the value at the requested memory address. The permission set 220 will be explained in greater detail with respect to FIG. 5.

The PD module 230, address module 240 and access type module 250 may include, for example, a hardware device including electronic circuitry for implementing the functionality described below, such as a register or Boolean logic. In addition or as an alternative, the modules 230, 240 and 250 may be implemented as a series of instructions encoded on a machine-readable storage medium and executable by a processor.

The PID module 230 is to compare the PID of the process 180 to the one or more allowed PIDs 222 of the permission set 220. For example, if the PID of the process 180 is included in the one or more allowed PIDs 222, the PID module 230 may output a logic one or high. Otherwise, the PID module 230 may output a logic zero or low.

The address module 240 is to compare the requested memory address to the memory address range 224 of the permission set 220. For example, if the requested memory address is included in the memory address range 224, the address module 240 may output a logic one or high. Otherwise, the address module 240 may output a logic zero or low.

The access type module 250 is to compare the requested access type to the one or more allowed access types 226 of the permission set 220. For example, if the requested access type is included in the one or more allowed access types 226, the access type module 250 may output a logic one or high. Otherwise, the access type module 250 may output a logic zero or low. The output of the access type module 250 is inverted by the NOT gate 280 and output from the permission module 210 as a fault signal.

The first NAND gate 260 logically NANDs the output of the PID module 230 and the address module 240 and outputs a miss signal out of the permission module 210. The first AND gate 270 logically ANDs the output of the PID module 230, the address module 240 and the access type module 250 and outputs an access control signal out of the permission module 210.

Thus, the permission module 210 allows access to the memory region 190 by the process 180 based on the comparisons of the PID, address, and access type modules 230, 240 and 250. Further, the permission module 210 asserts the miss signal if the PID module 230 indicates that the one or more allowed PIDs 222 does not include the PID of the process 180 and/or the address module 240 indicates that the memory address range 224 does not include the requested memory address. A more detailed example of the modules 230, 240 and 250 is provided below with respect to FIG. 3.

Figure 3:
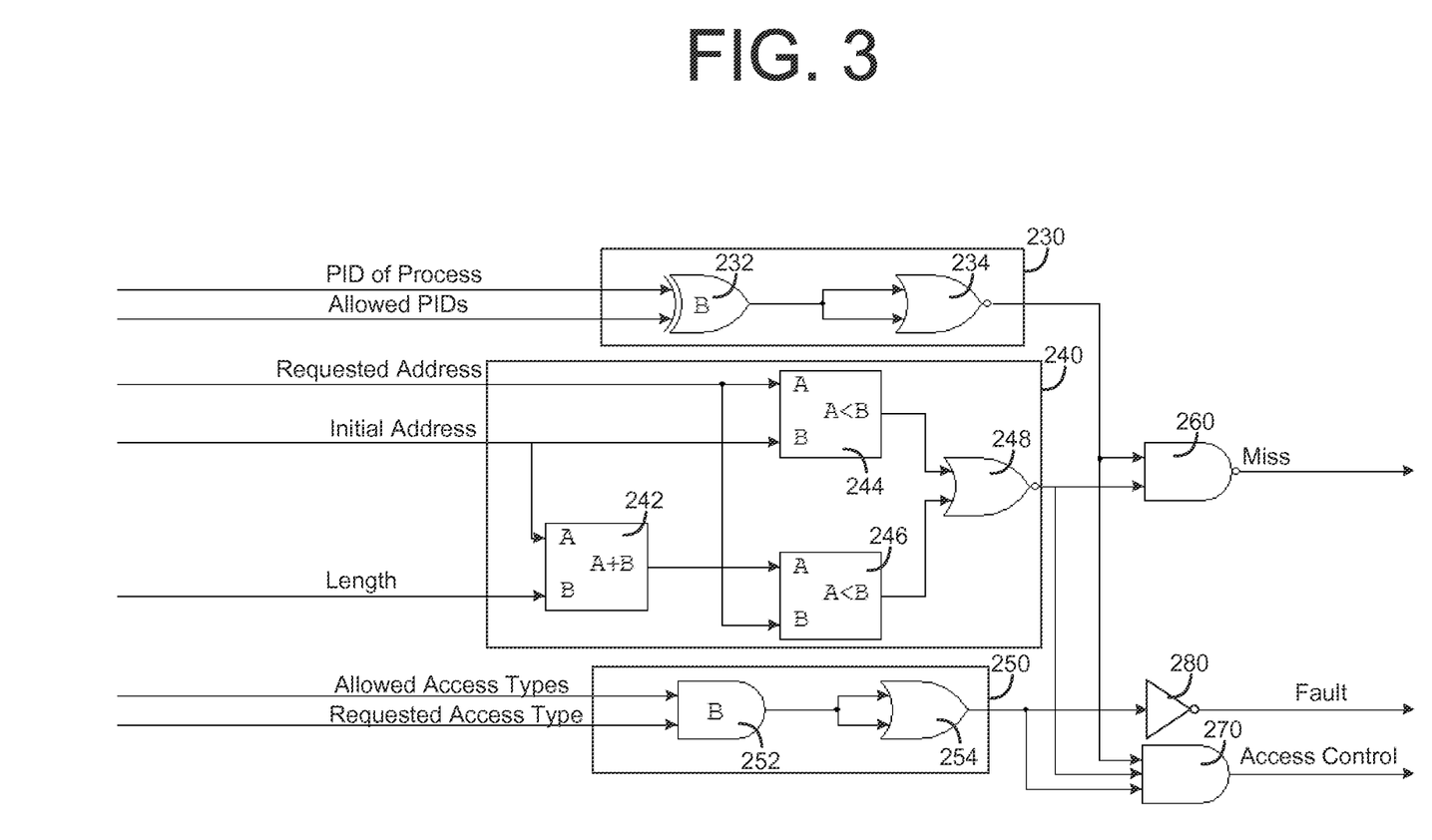
FIG. 3 is an example block diagram of modules included in the permission module of the device of FIG. 2.

FIG. 3 is an example block diagram of the modules 230, 240 and 250 included in the permission module 210 of the device of FIG. 2. In the embodiment of FIG. 3, the PID module 230 may include, for example, a bitwise XOR gate 232 and a first NOR gate 234. The PID of the process signal output from the process 180 and the allowed PIDs signal output from the permission set 220 received by the bitwise XOR gate 232 may be multi-bit fields. For example, each of the bits of the PID of the process signal and the allowed PIDs signal may correspond to one of a plurality of different types of PIDs, where each of the PIDs corresponds to a different process or type of process.

Depending on a number of PIDs associated with the memory region 190, more than one bit may be set in the allowed PIDs signal. However, only one of the bits of the PID of the process signal may be set to indicate the identity of the process 180. Thus, the bitwise XOR gate 232 bitwise logically XORs the corresponding bits of the PID of the process signal and the allowed PIDs signal. The first NOR gate 234 logically NORs all the bits of the output of XOR gate 232, thus also combining all of the bits output from the bitwise XOR gate 232. Hence, the output of the first NOR gate 234, as well as the output of the PID module 230, is a logic one or high if the PID of the process 180 is included in the one or more allowed PIDs 222 of the permission set 220.

The address module 240 may include, for example, an adder 242, a first comparator 244, a second comparator 246 and a second NOR gate 248. The first adder 242 receives an initial address and a length from the memory address range 224. The initial address represents a first address of the memory region 190 and a length represents a number of addresses included in the memory region 190. The adder 242 adds the initial address and the length to output a last memory address of the memory region 190 to the second comparator 246. The first comparator 244 bitwise magnitude compares the requested address of the process 180 to the initial address of the memory address range 224. The first comparator 244 outputs logic one or high signal if the requested address is less than the initial address. Otherwise, the first comparator 244 outputs a logic low or zero signal.

The second comparator 246 bitwise magnitude compares the last memory address to the requested address of the process 180. The second comparator 246 outputs logic one or high signal if the last memory address is less than the requested address. Otherwise, the second comparator 246 outputs a logic low or zero signal. The second NOR gate 248 logically NORs the output of the first and second comparators 244 and 246. The output of the second NOR gate 248, as well as the output of the address module 240, is a logic one or high if the requested address of the process 180 is included in the memory address range 224 of the permission set 220.

The access type module 250 may include, for example, a bitwise AND gate 252 and a first OR gate 254. The allowed access types signal of the permission set 220 and the requested access type signal of the process 180 input to the bitwise AND gate 252 may be multi-bit fields. For example, each of the bits of the allowed access types signal and the requested access type signal may correspond to one of a plurality of different access types, such as the read, write, and reference types, as explained above.

Depending on a number of access types associated with the memory region 190, more than one bit may be set in the allowed access type signal. However, only one of the bits of the requested access type may be set as the process 180 may only carry out one of the access types per access to the memory region 190. Thus, the bitwise AND gate 252 bitwise logically ANDs the corresponding bits of the allowed access types signal and the requested access type signal. The first OR gate 254 logically ORs all the bits of the output of the bitwise AND gate 252, thus also combining all of the bits output from the bitwise AND gate 252. Hence, the output of the first OR gate 254, as well as the output of the access type module 250, is a logic one or high if the requested access type is included in the one or more allowed access types 222 of the permission set 220. The first NAND gate 260, the first AND gate 270 and the NOT gate 280, may operate as explained above with respect to FIG. 2.

Figure 4:
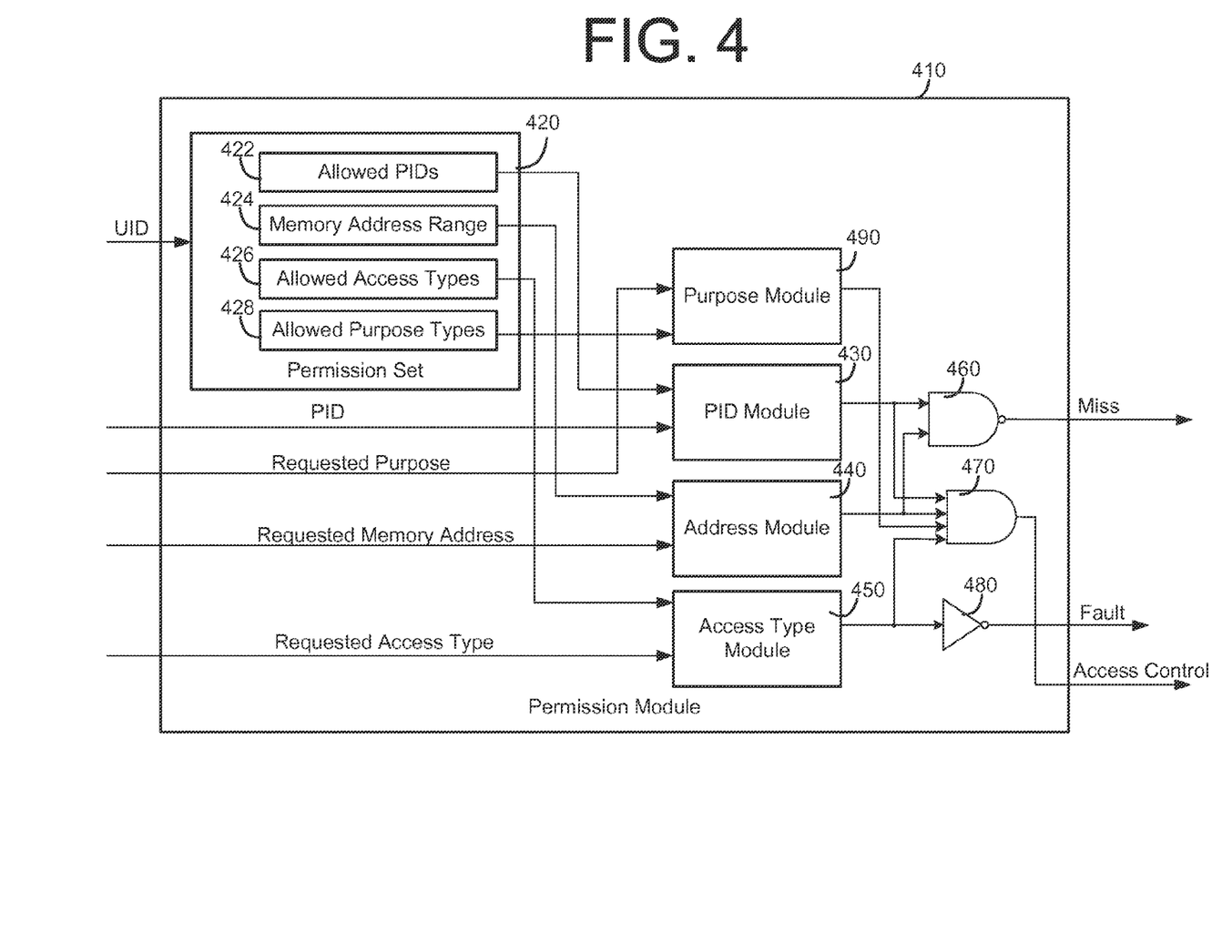
FIG. 4 is another example block diagram of the permission module of the device of FIG.

FIG. 4 is another example block diagram of the permission module 410 of the device 100 of FIG. 1. In the embodiment of FIG. 4, the permission module 410 includes a permission set 420, a PID module 430, an address module 440, an access type module 450, a first NAND gate 460, a first AND gate 470, a NOT gate 480 and a purpose module 490. The PID module 430, address module 440, access type module 450, first NAND gate 460, first AND gate 470 and NOT gate 480 of FIG. 4 may be respectively similar to the PID module 230, address module 240, access type module 250, first NAND gate 260, first AND gate 270 and NOT gate 280 of FIG. 2. However, the first AND gate 470 may also receive an output of the purpose module 490. In addition, the request of the process 180 may further include a user ID (UID) field and a requested purpose.

The permission set 420 of the FIG. 4 may be similar to the permission set 220 of FIG. 2. For example, permission set 420 of FIG. 4 includes one or more allowed PIDs 422, a memory address range 424 and one or more allowed access types 426, which is similar to the one or more allowed PIDs 222, the memory address range 224 and the one or more allowed access types 226 included in the permission set 220 of FIG. 2. However, the permission set 420 of FIG. 4 also receives the UID and includes one or more allowed purposes 428, as explained below.

The UID field may identify a type of user and/or an identity of the user. The type of user may relate to user groups, such as staff or administrator. The identity of the user may relate to identifying a specific user. The permission set 420 may include a plurality of instances of at least part of the permission set 420. Each of the instances may be associated with one of a plurality of UIDs and include separate permissions for the memory region 190, as explained in greater detail below with respect to FIG. 5.

The requested purpose indicates how the process 180 seeks to use the confidential information 192 at the requested memory address. Examples of the requested purpose may include a storage destination of the confidential information 192, such as an external memory, a type of operation to be performed on the confidential information 192, such as a type of cryptographic operation, and the like.

The purpose module 490 may include, for example, a hardware device including electronic circuitry for implementing the functionality described below, such as a register or Boolean logic. In addition or as an alternative, the permission module 410 may be implemented as a series of instructions encoded on a machine-readable storage medium and executable by a processor.

The purpose module 490 is to compare the requested purpose to the one or more allowed purposes of the permission set 420. For example, the permission set 420 may send an allowed purpose types signal to the purpose module 480, where the allowed purpose types signal and the requested purpose signal are multi-bit signals. The purpose module 490 may carry out the comparison of the two multi-bit signals in a manner similar to that of the access type module 450. If the requested purpose is included in the one or more allowed purpose types 428, the purpose module 480 may output a logic a logic one or high. Otherwise, the purpose module 480 may output a logic a logic zero or low.

The first AND gate 470 logically ANDs the outputs of the purpose module 480, the PID module 430, the address module 440 and the access type module 450 and outputs an access control signal out of the permission module 410. Thus, the permission module 410 allows access to the memory region 190 by the process 180 based on the comparisons of the purpose, PID, address, and access type modules 490, 430, 440 and 450.

Similar to FIG. 2, the first NAND gate 460 logically NANDs the output of the PID module 430 and the address module 440 and outputs the miss signal out of the permission module 410. Also, the NOT gate 480 inverts the output of the access type module 450 to output a fault signal. Thus, the permission module 410 asserts the fault signal if the one or more allowed access types 426 does not include the requested access type. However, embodiments may also, for example, assert the fault signal if the one or more purpose types 428 does not include the requested purpose.

Figure 5:
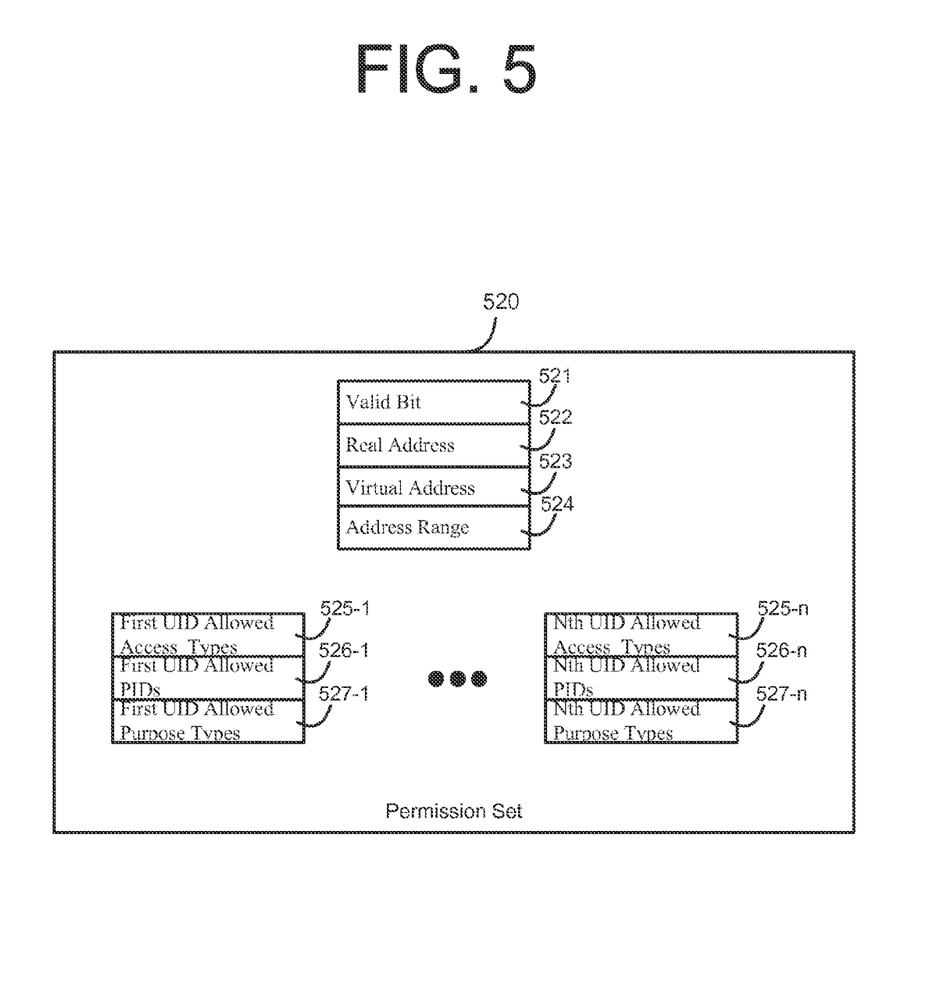
FIG. 5 is an example block diagram of a permission set of the permission module of FIG. 4.

FIG. 5 is an example block diagram of the permission set 520 of the permission module 410 of FIG. 4. In this embodiment, the permission set 520 includes seven fields 521 to 527, where at least some of the fields 525 to 527 include multiple instances. The first field 521 may store a valid bit to indicate whether the permission set 520 is active and assigned to the memory region 190. If the valid bit of the first field 521 is not set, the device 100 may ignore the permission set 520. The second field 522 may store the real address, such as the requested address of the process 180. The third field 523 may store the virtual address that corresponds to a location in the memory region 190 mapped to the real address. The fourth field 524 may store the memory address range of the memory region 190, such as the initial address and the length of the memory region 190. The fifth through seventh fields 525 to 527 may have n instances, where n is a natural number. Each of the instances of the fifth field 525-1 to 525-*n* may store the allowed access types for a corresponding one of the UIDs. Each of the instances of the sixth field 526-1 to 526-*n* may store the allowed PIDs for the corresponding one of the UIDs. Each of the instances of the seventh field 527-1 to 527-*n* may store the allowed purpose types for the corresponding one of the UIDs.

Each of the groups of instances for each UID may have different permissions. For example, the first instances 525-1 to 527-1 of the first UID may relate to staff users while the nth instances 525-*n* to 527-*n* of the nth UID may relate to supervisor users. In this example, the allowed access types of the first UID 525-1 may only enable the read access type while the allowed access type of the nth UID 525-*n* may enable all of the read, write and reference access types. The permission set 520 may choose one of the groups of instances to forward to the modules 480, 430 and 450, based on the user identified by the UID.

While the permission set 520 is shown to have seven fields 521 to 527 and multiple instances for three of those fields 525 to 527 for different UIDs, embodiments are not limited thereto. For example, embodiments may have more or less than seven fields and/or instances of more or less than three of the fields. Further, the instances may be created and/or grouped according to criteria other than the UID.

Figure 6:
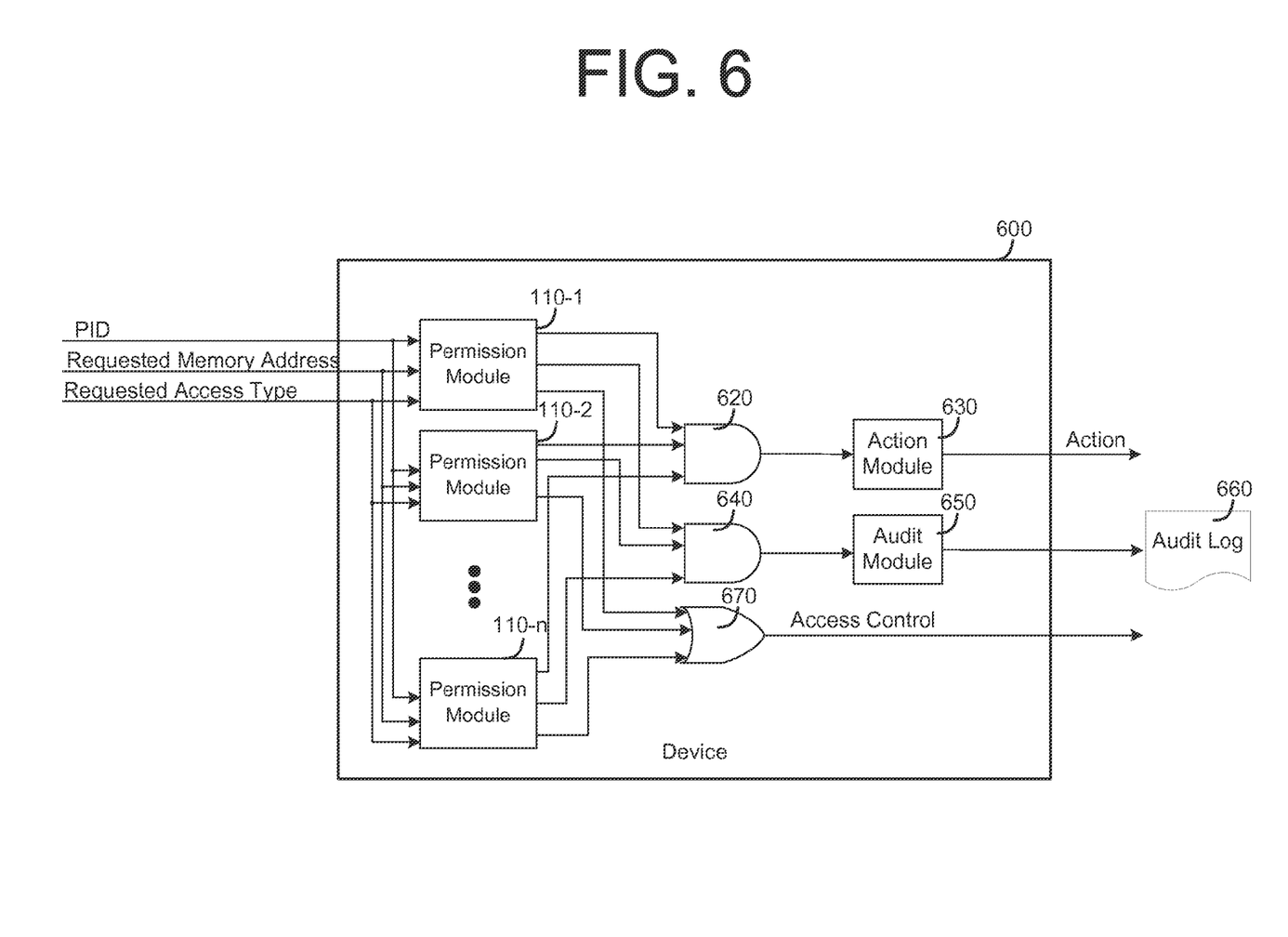
FIG. 6 is another example block diagram of a device for controlling access to a memory region.

FIG. 6 is another example block diagram of a device 600 for controlling access to a memory region 190. In this embodiment, the device 600 includes a plurality of permission modules 110-1 to 110-*n* of FIG. 1, where n is a natural number. Embodiments of the device 600 may also include a plurality of other types of permission modules, such as the permission modules 210 or 410 of FIG. 2 or 4. The device 600 further includes a second AND gate 620, a third AND gate 640, a second OR gate 670, an action module 630 and an audit module 650.

The action and audit modules 630 and 650 may include, for example, a hardware device including electronic circuitry for implementing the functionality described below, such as a register or Boolean logic. In addition or as an alternative, the action and audit modules 630 and 650 may be implemented as a series of instructions encoded on a machine-readable storage medium and executable by a processor.

Each of the permission modules 110-1 to 110-*n* may include separate permission sets that are associated with different memory regions, as explained in greater detail below with respect to FIG. 7. However, all of the permission modules 110-1 to 110-*n* may receive the same PID of the process 180, the requested memory address, and the requested access type, from the process 180. The second AND gate 620 logically ANDs the miss signals of all the permission modules 110-1 to 110-*n* and outputs an action signal to the action module 630. Thus, the action signal is only asserted if all of the permission modules 110-1 to 110-*n* assert the miss signal.

The action module 630 is to carry out an action if the action signal is asserted, e.g. the PID module 230 and/or the address module 240 of the permission modules 110-1 to 110-*n* determine that the one or more allowed PIDs 222 do not include the PID of the process 180 and/or the memory address range 224 does not include the requested memory address. The action carried out by the action module 630 may include doing nothing, erasing a value at the requested memory address, erasing all values at the memory region and/or generating an interrupt. The interrupt may block access to and/or halt operation of a functionality of the device 600 and/or components related to the device 600, such as a processor or memory. Some of the above actions may improve security by preventing an unauthorized party from making further attempts to access the requested memory address.

The third AND gate 620 logically ANDs the fault signals of all the permission modules 110-1 to 110-*n* and outputs an audit signal. Thus, the audit signal is only asserted if all of the permission modules 110-1 to 110-*n* assert the fault signal. The audit module 650 is to generate an audit log 660 if the audit signal is asserted, e.g. the access type module 250 of the permission modules 110-1 to 110-*n* determines that the one or more allowed access types 226 does not include the requested access type. The audit log 660 may include the PID of the process 180, the requested address, the requested access type, the UID, a number of failed access attempts, a timestamp of the one or more failed access attempts, and/or the like. The audit log 660 may be configurable. For example, the audit module 650 may be configured to vary the contents and/or length of the audit log 660. Further, a method for saving the audit log 660 may also be configured, such as a flat file method that stops when the audit log 660 is full, a circular file method that overwrites old data with new data when the audit log 660 is full, and/or combination thereof.

The second NOR gate 620 logically NORs the access control signals of all the permission modules 110-1 to 110-*n* and outputs an access control signal. Thus, the device 600 asserts the access control signal to grant the process 180 access to the memory region 180, if at least one of the permission modules 110-1 to 110-*n* grants access to the memory region 180. While the action and audit modules 630 and 650 are shown to operate in conjunction with a plurality of permission modules 110-1 to 110-*n*, the action and audit modules 630 and 650 may also be operate in conjunction with a single permission module 110.

Figure 7:
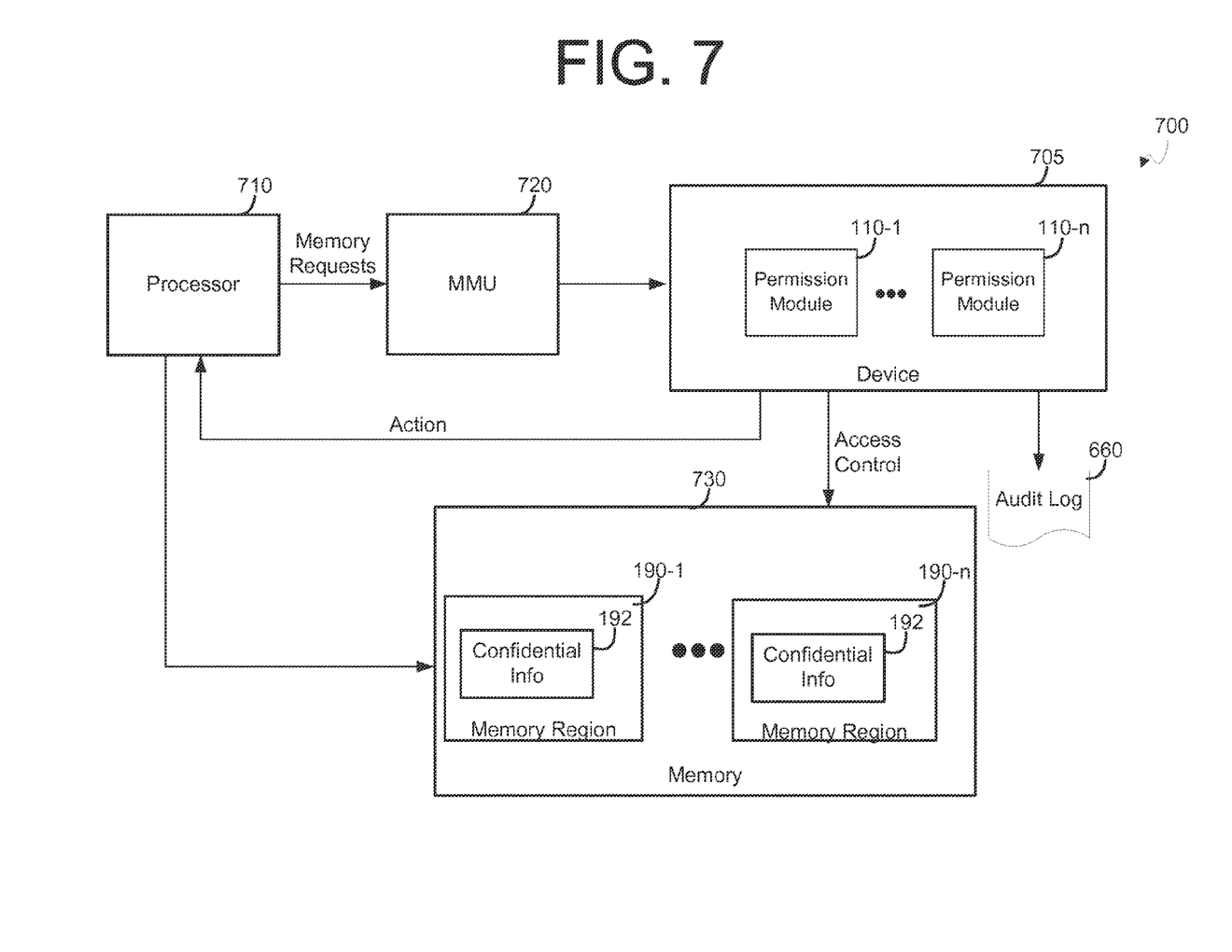
FIG. 7 is an example block diagram of a system including the device of FIG. 6.

FIG. 7 is an example block diagram of a system 700 including the device 600 of FIG. 6. In the embodiment of FIG. 7, the system 700 includes a device 705, a processor 710, a memory management unit 720 and memory 730. The device 705 of FIG. 7 may be similar to the device 600 of FIG. 6. However, embodiments of the system 700 may also include other similar devices, such as the device 100 of FIG. 1. The memory 730 includes a plurality of memory regions 190-1 to 190-*n* (n is a natural number), where each of the memory regions 190-1 to 190-*n* may be similar to the memory region 190 of FIG. 1. Each of the permission modules 110-1 to 110-*n* corresponds to one of the memory regions 190-1 to 190-*n*. For example, each of the permission modules 110-1 to 110-*n* may include a permission set 120 that controls access to the confidential information 192 of one of the corresponding memory regions 190-1 to 190-*n*.

The processor 710 may be, at least one central processing unit (CPU), at least one semiconductor-based microprocessor, at least one graphics processing unit (GPU), other hardware devices suitable for retrieval and execution of instructions of the process 180. The processor 710 may output the memory request of the process 180 and/or receive the action signal.

The MMU 720 may share responsibilities with the device 700 for controlling aspects of memory map management. For example, at least one of the device 700 and the MMU 210 may define the address ranges for different parts of the memory 730, such as the plurality of memory regions 190-1 to 190-*n*, and/or map real (e.g. internal or physical) addresses to virtual (e.g., logical or external) addresses. Further, the MMU 720 may manage access control for regions of the memory 730 that do not include the confidential information 192 while the device 700 may manage access control for regions of the memory 730 that do include the confidential information 192.

The processor 710 may communicate with the MMU 710 when the processor 710 seeks to access the memory 730, such as after executing an instruction of the process 180. For instance, the processor 710 may transmit one or more requests to the MMU 720. In turn, the MMU 720 may transmit all of the memory requests to the device 700 or transmit only the memory requests to the device 700 that relate to the confidential information 192 managed by the permission modules 110-1 to 110-n. If all the memory requests are transmitted to the device 700, the device 700 may include additional processing logic to carry out some functions also generally carried out at the MMU 720, but overall performance may be increased. If only the memory requests that relate to the confidential information 192 managed by the permission modules 110-1 to 110-n are sent to the device 700, the device 700 may have a more compact design and allow for easier integration into the system 700. The memory request is transmitted to all of the plurality of permission modules 110-1 to 110-n when received by the device 700.

Figure 8:
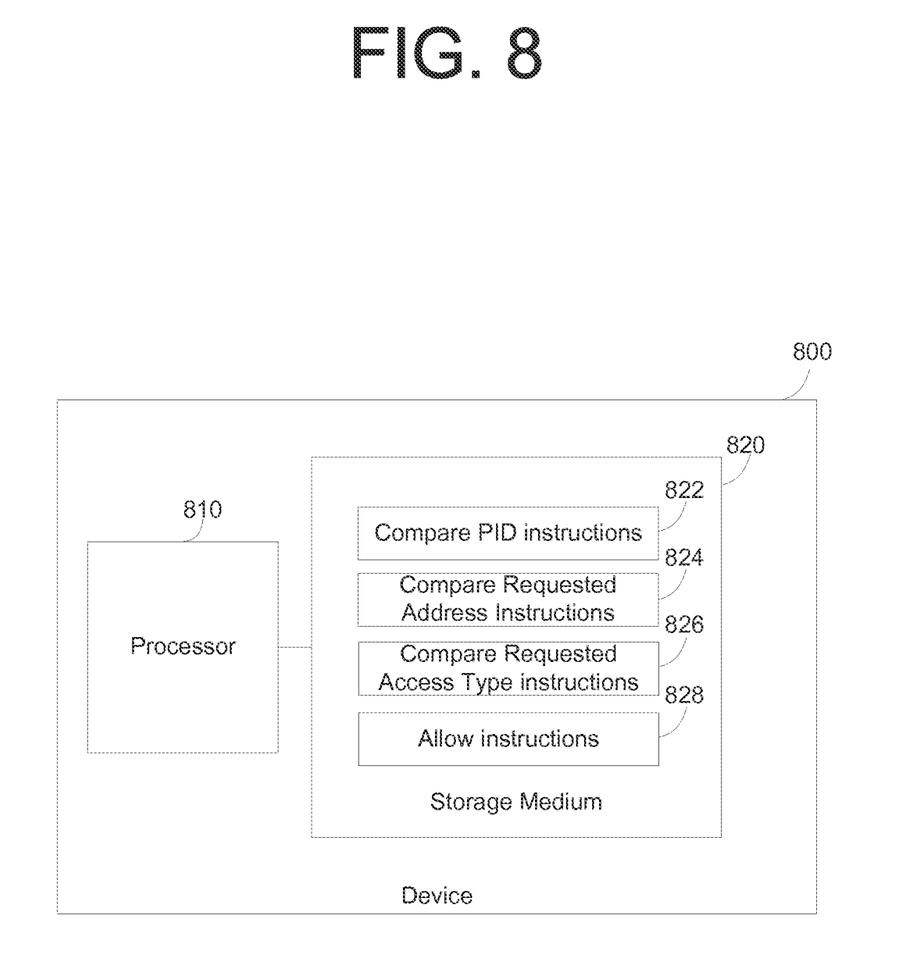
FIG. 8 is an example block diagram of a computing device including instructions for controlling access to a memory region.

FIG. 8 is an example block diagram of a computing device 800 including instructions for controlling access to a memory region (not shown). In the embodiment of FIG. 8, the computing device 800 includes a processor 810 and a machine-readable storage medium 820. The machine-readable storage medium 820 further includes instructions 822, 824, 826 and 828 for controlling access to the memory region (not shown).

The computing device 800 may be, for example, a chip set, a notebook computer, a slate computing device, a portable reading device, a wireless email device, a mobile phone, or any other device capable of executing the instructions 822, 824, 826 and 828. In certain ex pies, the computing device 800 may include or be connected to additional components such as memories, sensors, displays, etc.

The processor 810 may be, at least one central processing unit (CPU), at least one semiconductor-based microprocessor, at least one graphics processing unit (GPU), other hardware devices suitable for retrieval and execution of instructions stored in the machine-readable storage medium 820, or combinations thereof. The processor 410 may fetch, decode, and execute instructions 822, 824, 826 and 828 to implement controlling access to the memory region. As an alternative or in addition to retrieving and executing instructions, the processor 810 may include at least one integrated circuit (IC), other control logic, other electronic circuits, or combinations thereof that include a number of electronic components for performing the functionality of instructions 822, 824, 826 and 828.

The machine-readable storage medium 820 may be any electronic, magnetic, optical, or other physical storage device that contains or stores executable instructions. Thus, the machine-readable storage medium 820 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 820 can be non-transitory. As described in detail below, machine-readable storage medium 820 may be encoded with a series of executable instructions for controlling access to the memory region.

Figure 9:
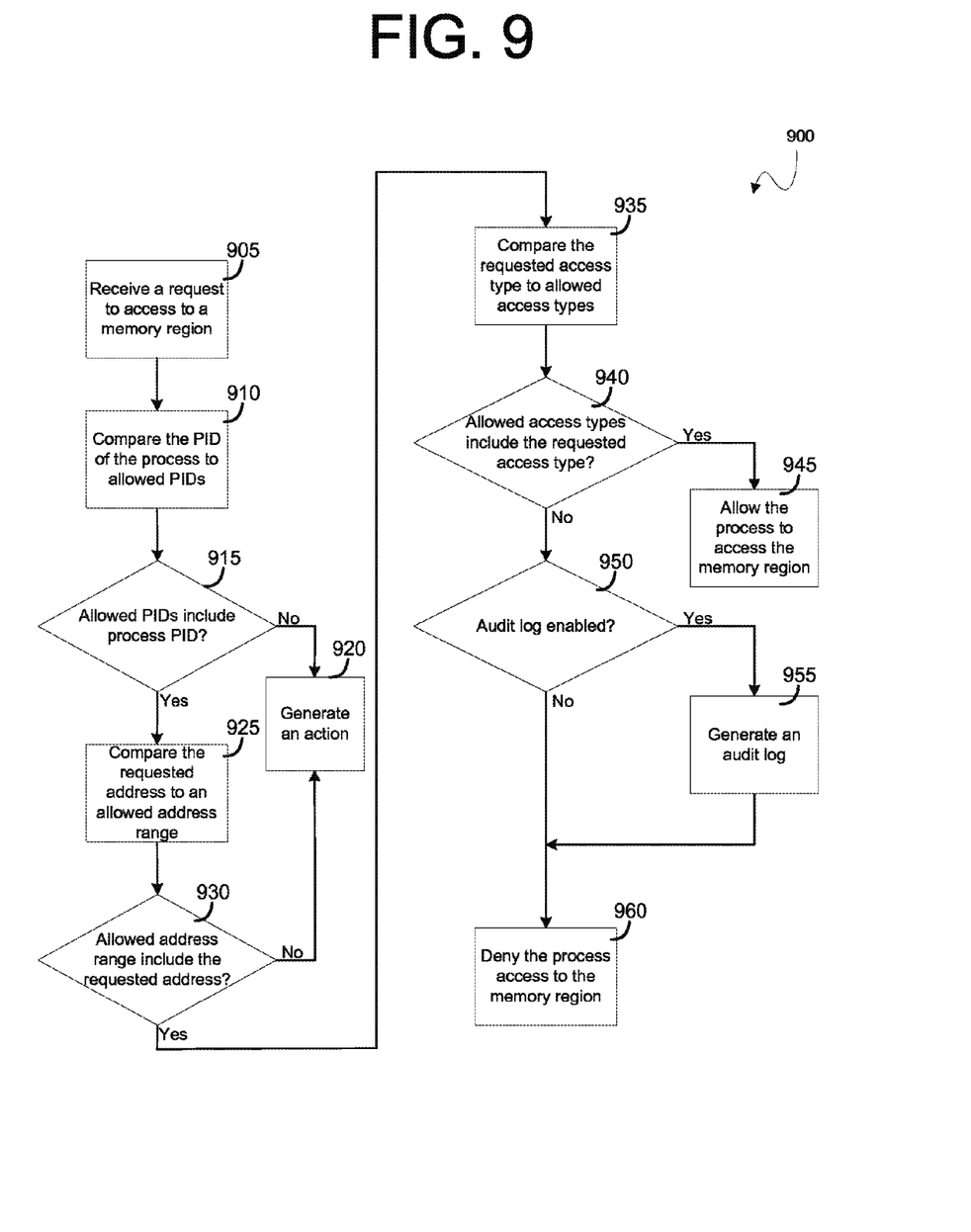
FIG. 9 is an example flowchart of a method for controlling access to a memory region.

Moreover, the instructions 822, 824, 826 and 828 when executed by a processor (e.g., via one processing element or multiple processing elements of the processor) can cause the processor to perform processes, such as, the process of FIG. 9. For example, the compare PID instructions 822 may be executed by the processor 810 to compare a PID of a process (not shown) to one or more allowed PIDs. The compare requested address instructions 824 may be executed by the processor 810 to compare a requested address to an allowed address range.

The compare requested access type instructions 826 may be executed by the processor 810 to compare the requested access type to one or more allowed access types. The allow instructions 828 may be executed by the processor 810 to allow the process to access the memory region including confidential information (not shown), if the one or more allowed PIDs includes the PID of the process, the allowed address range includes the requested address and the one or more allowed access types includes the requested access type.

The machine-readable storage medium 820 may also include instructions (not shown) to at least one of generate an audit log and carry out an action if the one or more allowed PIDs does not include the PID of the process, the allowed address range does not include the requested address and/or the one or more allowed access types does not include the requested access type. The audit log includes at least one of the PID of the process, the requested memory address, the requested access type, a user ID (UID), a requested purpose, a number of failed access attempts, and a timestamp of the one or more failed access attempts. The action includes at least one of doing nothing, erasing a value at the requested memory address, erasing all values at the memory region, and generating an interrupt. An operation of the device 800 may be described in more detail with respect to FIG. 9.

FIG. 9 is an example flowchart of a method 900 for controlling access to a memory region 190. Although execution of the method 900 is described below with reference to the device 600, other suitable components for execution of the method 900 can be utilized, such as the device 100. Additionally, the components for executing the method 900 may be spread among multiple devices (e.g., a processing device in communication with input and output devices). In certain scenarios, multiple devices acting in coordination can be considered a single device to perform the method 900. The method 900 may be implemented in the form of executable instructions stored on a machine-readable storage medium, such as storage medium 820, and/or in the form of electronic circuitry.

At block 905, the device 600 receives from a process 180 a request to access a memory region 190 having confidential information 192. The request includes a process ID (PID) of the process, a requested address, and a requested access type. Then, at block 910, the device 600 compares the PID of the process 180 to one or more allowed PIDs 222 and flows to block 915. If the one or more allowed PIDs does not include the PID of the process 180, the device 600 generates an action at block 920. As explained above, the action includes at least one of doing nothing, erasing a value at the requested memory address, erasing all values at the memory region, and generating an interrupt.

If the one or more allowed PIDs include the PID of the process 180, the device 600 compares the requested address to an allowed address range at block 925 and then flows to block 930. If the allowed address range does not include the requested address, the device 600 generates the action at block 920.

If the allowed address range includes the requested address, the device 600, compares the requested access type to one or more allowed access types at block 935 and then flows to block 940. If the one or more allowed access types include the requested access type, the device 600 allows the process 180 to access the memory region 190 at block 945. If the one or more allowed access types does not include the requested access type, the device 600 flows to block 950 to determine if an audit log is enabled. If the audit log is not enabled, the device 600 denies the process 180 access to the memory region 190 at block 960. If the audit log is enabled, the device 600 generates the audit log 660 at block 955 and then denies the process 180 access to the memory region 190 at block 960.

According to the foregoing, embodiments may increase a security and/or integrity of the confidential information without greatly increasing a complexity of the device. For example, in embodiments, a memory request from a process may be received. The memory request may include PID of the process, a requested memory address, and a requested access type. The memory request may be compared to a permission set associated with a memory region including the confidential information. Access to the memory region by the process may be controlled based on the comparison.

I claim:

1. A device comprising:
a hardware permission module to receive a memory request from a process, the memory request including a process ID (PID) of the process, a requested memory address, a requested access type, and a requested purpose to indicate how confidential information at the requested memory address is to be used, wherein
the hardware permission module compares the memory request to a permission set associated with a memory region storing the confidential information,
the permission set includes one or more allowed PIDs, a memory address range, one or more allowed access types associated with the memory region, and one or more allowed purposes,
the access types include at least one of read, write, or reference types,
the reference type relates to providing a pointer to the requested memory address,
the hardware permission module includes a purpose module to compare the requested purpose to the one or more allowed purposes, and
the hardware permission module controls access to the memory region by the process based on the comparisons of the PID, address, access type, and hardware permission modules.

2. The device of claim 1, wherein the hardware permission module includes,
a PID module to compare the PID of the process to the one or more allowed PIDs;
an address module to compare the requested memory address to the memory address range; and
an access type module to compare the requested access type to the one or more allowed access types.

3. The device of claim 2, wherein,
the hardware permission module is to assert a miss signal if at least one of 1) the PID module indicates that the one or more allowed PIDs does not include the PID of process, or ii) the address module indicates that the memory address range does not include the requested memory address, and
the hardware permission module is to assert a fault signal if the access type module indicated that the one or more allowed access types does not include the requested access type.

4. The device of claim 1, wherein,
the memory request further includes a user ID (UID) field to identify at least one of a type of user and an identity of the user, and
the permission set includes a plurality of instances of part of the permission set for the memory region, each of the instances to be associated with one of a plurality of UIDs.

5. The device of claim 1, further comprising:
an audit module to generate an audit log if the access type module determines that the one or more allowed access types does not include the requested access type, wherein
the audit log includes at least one of the PID of the process, the requested memory address, the requested access type, a user ID (UID), the requested purpose, a number of failed access attempts, or a timestamp of the one or more failed access attempts.

6. The device of claim 1, further comprising:
an action module to carry out an action if the access type module determines that the one or more allowed access types does not include the requested access type, wherein
the action includes at least one of doing nothing, erasing a value at the requested memory address, erasing all values at the memory region, or generating an interrupt, and
the interrupt at least one of blocks access to and halts operation of a functionality of the device.

7. A system, comprising:
a permission module to receive a memory request from a process, the memory request including a process ID (PID) of the process, a requested memory address, a requested access type, and a requested purpose to indicate how confidential information at the requested memory address is to be used, wherein
the permission module compares the memory request to a permission set associated with a memory region storing the confidential information,
the permission set includes one or more allowed PIDs, a memory address range, one or more allowed access types associated with the memory region, and one or more allowed purposes,
the access types include at least one of read, write, or reference types,
the reference type relates to providing a pointer to the requested memory address,
the permission module includes a purpose module to compare the requested purpose to the one or more allowed purposes, and
the permission module controls access to the memory region by the process based on the comparisons of the PID, address, access type, and permission modules;
a memory including a plurality of memory regions, the permission module corresponding to one of the memory regions;
a processor to output the request; and
a memory management unit (MMU) to transmit the request to the permission module.

8. The system of claim 7, wherein the permission module includes,
a PID module to compare the PID of the process to the one or more allowed PIDs;
an address module to compare the requested memory address to the memory address range; and
an access type module to compare the requested access type to the one or more allowed access types.

9. The system of claim 8, wherein,
the permission module is to assert a miss signal if at least one of i) the PID module indicates that the one or more allowed PIDs does not include the PID of process, or ii) the address module indicates that the memory address range does not include the requested memory address, and
the permission module is to assert a fault signal if the access type module indicates that the one or more allowed access types does not include the requested access type.

10. The system of claim 9, further comprising a plurality of permission modules, wherein,
each of the permission modules include separate permission sets associated with one of the memory regions,
the system asserts an action signal only if all of the permission modules assert the miss signal,
the system asserts an audit signal only if all the of the permission modules assert the fault signal, and
the system asserts an access control signal to grant the processor access to the memory, if at least one of the permission modules allows access.

11. The system of claim 10, wherein,
the MMU receives a plurality of memory requests, and
the MMU one of i) transmits all of the memory requests, or ii) only the memory requests related to the memory regions associated with at least one of the permission modules.

12. A method for memory access, comprising:
receiving a memory request from a process, the memory request including a process ID (PID) of the process, a requested memory address, a requested access type, and a requested purpose to indicate how confidential information at the requested memory address is to be used;
comparing the memory request to a permission set associated with a memory region storing the confidential information, the permission set including one or more allowed PIDs, a memory address range, one or more allowed access types associated with the memory region, and one or more allowed purposes, and wherein:
the access types include at least one of read, write, or reference types, and
the reference type relates to providing a pointer to the requested memory address; and
controlling access to the memory region by the process based on the comparisons of the PID, address, access type, and allowed purposes.

13. The method of claim 12, further comprising:
generating an action if at least one of i) the one or more allowed PIDs does not include the PID of the process, or ii) the allowed address range does not include the requested address; and
generating an audit log if the one or more allowed access types does not include the requested access type.

14. A non-transitory computer-readable storage medium storing instructions that, if executed by a processor of a device, cause the processor to:
receive a memory request from a process, the memory request including a process ID (PID) of the process, a requested memory address, a requested access type, and a requested purpose to indicate how confidential information at the requested memory address is to be used;
compare the memory request to a permission set associated with a memory region storing the confidential information, the permission set including one or more allowed PIDs, a memory address range, one or more allowed access types associated with the memory region, and one or more allowed purposes, and wherein:
the access types include at least one of read, write, or reference types, and
the reference type relates to providing a pointer to the requested memory address; and
control access to the memory region by the process based on the comparisons of the PID, address, access type, and allowed purposes.

15. The non-transitory computer-readable storage medium of claim 14, further comprising instructions that, if executed by the processor, cause the processor to:
at least one of generate an audit log and carry out an action if at least one of i) the one or more allowed PIDs does not include the PID of the process, ii) the allowed address range does not include the requested address, or iii) the one or more allowed access types does not include the requested access type, wherein
the audit log includes at least one of the PID of the process, the requested memory address, the requested access type, a user ID (UID), a requested purpose, a number of failed access attempts, or a timestamp of the one or more failed access attempts, and
the action includes at least one of doing nothing, erasing a value at the requested memory address, erasing all values at the memory region, or generating an interrupt.

* * * * *